United States Patent Office 2,981,846
Patented Apr. 25, 1961

2,981,846
CONTROL CIRCUIT FOR ELECTROMAGNETIC CLUTCHES AND LIKE DEVICES

Jean Maurice and Michel Rist, Paris, France, assignors to Societe Anonyme Francaise du Ferodo, Paris, France, a corporation of the French Republic Filed June 5, 1958, Ser. No. 740,099

Claims priority, application France June 5, 1957

22 Claims. (Cl. 290—50)

The present invention relates to the electric supply of all apparatus which requires to be subjected to a voltage increasing as a function of the speed, following an approximately parabolic curve, and especially for electro-magnetic clutches, more particularly for automobile vehicles, the transmissible torque of which varies in accordance with the voltage developed at the terminals of an electro-magnet which operates the gripping device of the clutch, the action of the electro-magnet being capable of combination with any elastic device which tends to produce the clutching or de-clutching action.

In addition to the de-clutching which must be effected at each change of gear, and which may be obtained either by the electro-magnetic clutch itself or by an auxiliary de-clutching device with all appropriate means, automatic or non-automatic, such electro-magnetic clutches must be able to ensure a high degree of progression of the engagements and re-engagements, especially when the vehicle is started-up.

To this end, it has already been proposed to supply the electro-magnetic clutch from a dynamo—preferably the dynamo of the vehicle—whilst varying its normal arrangement, at least during one phase of operation, so as to make the characteristic curve (voltage-engine speed) at the terminals of the clutch more or less parabolic, and similar to the curve of a centrifugal clutch. It has also been proposed to associate the dynamo with circuits of variable characteristics, controlled in depedence on various parameters of operation.

The known arrangements however comply unsatisfactorily with the double condition of obtaining in all circumstances a shockless progression of the clutch during starting, and effective charging of the battery by the dynamo, without any complexity of construction.

The present invention has for its object improvements in electric supply systems, especially of electro-magnetic clutches, of the kind referred to above, in order to obtain a characteristic curve of voltage to speed which is favourable to progression, to avoid all shocks during the period of slip of the clutch, and to retain very effective charging of the battery.

In accordance with one of the special features of the invention, the control circuit of an electro-magnetic clutch or like device, especially for an automobile vehicle, is supplied from the armature of a dynamo, the excitation of which is adapted to receive two different forms, on the one hand a mixed excitation during preferably the whole period of engagement from a source of direct-current voltage through at least one resistance and from the voltage of the dynamo through at least one resistance, and on the other hand, a self-excitation outside the said period, switching means being provided for changing-over from one form of excitation to the other.

Further features and advantages of the invention will also become apparent from the description which follows below of forms of embodiment chosen by way of example, reference being made to the accompanying drawings, in which.

Figure 1:
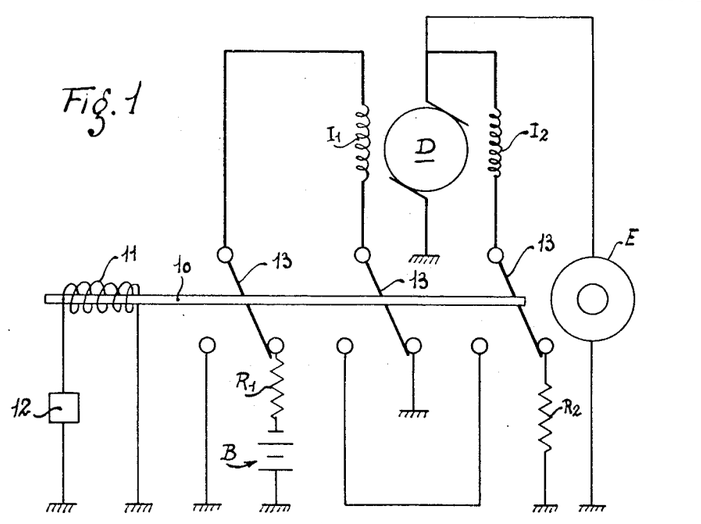
Fig. 1 is a circuit diagram of the dynamo in a position which corresponds to one of the forms of excitation of the dynamo.
Figure 1A:
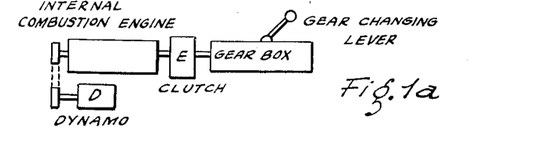
Fig. 1a shows diagrammatically the engine, the dynamo, the clutch, and the gear-box of the vehicle.

Reference will first of all be made to Figs. 1 and 1a in which there is shown at B the accumulator battery of the vehicle, at D the dynamo or generator, and at E the electro-magnetic clutch of the vehicle, supplied by the dynamo D. The curve of the increase in the voltage U developed by the dynamo D on the clutch E as a function of the speed N of the dynamo, that is to say of the engine speed (see Fig. 3), differs according to the method of connection of the field unit. When the field winding is excited from a separate source, the voltage U is proportional to the speed N, which results in the straight line A of Fig. 3. When the field winding is excited in shunt, that is to say by the dynamo D, there is obtained a curve S which is first of all almost horizontal and then rises sharply. This latter mode of excitation is standard and is perfectly suited to the desired conditions of charging. It enables the charging-regulator to change-over at a relatively low engine speed, of the order of 1,000 r.p.m. However, neither the straight line A nor the curve S satisfy the desired two-fold conditions for charging and progressive supply of the clutch E during the period of slip, the first because it is too spread-out, and the second because its slope is too steep.

Figure 3:
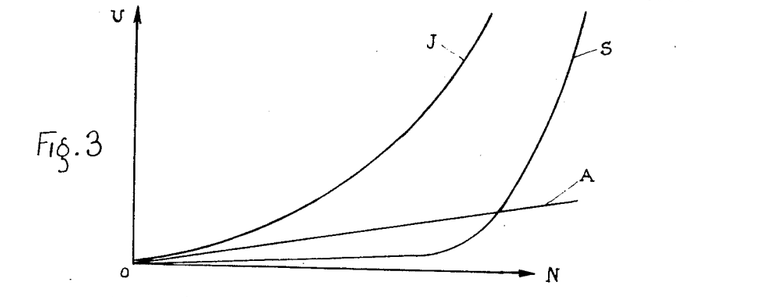
Figs. 3, 4, 5 and 6 are curves which illustrate the variations of various factors as a function of the engine speed.

By combining these two curves A and S by any suitable arrangement of the dynamo circuit, it is possible to reach a kind of compromise, and certain arrangements have already been proposed for this purpose, but these have disadvantages of varying extents.

The invention comprises a particular means of combining the curves A and S which complies better than any of the known arrangements to the conditions imposed in practice. In accordance with this means, instead of using successively different means of exciting the field winding, provision is made for dividing the field winding into two portions $I_1$ and $I_2$, and to excite one of these portions in a manner different from that with which the other portion is simultaneously excited. The portions $I_1$ and $I_2$ may be symmetrically arranged on the pole-pieces of the dynamo. They could also be arranged one on one pole-piece or pole-group, and the other on another pole-piece or pole-group.

As can be seen from Fig. 1, the portion $I_1$ is supplied from the battery B through a resistance $R_1$, whilst the portion $I_2$ is supplied from a brush of the dynamo D through a resistance $R_2$. The curve J thus obtained has a parabolic form, and shows an excellent condition of progression. The adjustment of the resistances $R_1$ and/or $R_2$ according to the invention, enables the curve J to be given at will the form which is best suited to the desired conditions. By reducing $R_1$, the angular coefficient of the tangent to the origin of the curve J about the origin O is increased. When $R_2$ is decreased, the curve J is moved laterally towards the left.

In practice, the resistance $R_1$ is adjusted at the outset in order to obtain a good progression of manoeuvre, while the resistance $R_2$ is regulated so as to prevent the phenomenon of hunting, which takes the form of jerks. Either of the resistances $R_1$ or $R_2$, and preferably the resistance $R_1$, may be made adjustable from time to time in order to take account of a variation of the torque transmitted by the clutch as a function of its wear, all other things being equal.

With the connections shown in heavy lines in Fig. 1, the dynamo D thus ensures a progressive supply of the clutch E, which results, particularly during starting, in an engagement of the clutch which is also progressive.

The dynamo D however must in addition carry out its function which remains essential, of suitably and effectively charging the battery B. There is therefore provided a coupling between the dynamo and the battery, with a control for producing the change-over to battery-charging.

In accordance with the invention, this control is regulated in such manner that the change-over to battery charging only takes place after all slip has ceased in the clutch, in order to prevent any abrupt change in voltage due to the change-over causing any substantial shock in the transmission.

Figure 2:
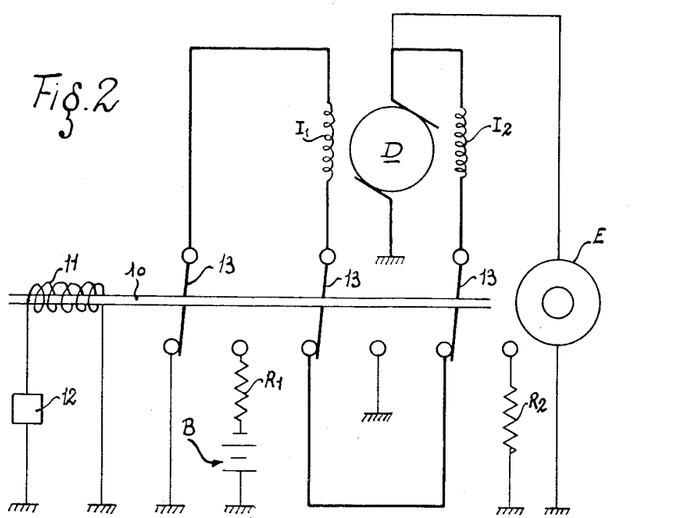
Fig. 2 is similar to the diagram of Fig. 1, but shown in a position which corresponds to another form of excitation.

On the other hnad, once the change-over to battery charging has been made, it is necessary that the excitation to the dynamo should be such that the charging of the battery is effective. It is to be noted that the diagram of Fig. 1 which is favourable for the progression of the clutch is not well adapted to ensure an effective charge of the battery and, in accordance with the invention, provision is made for substituting at the desired moment the traditional shunt connection (shown in heavy lines in Fig. 2) for that of Fig. 1, in order to improve the method of charging the battery. To this end, a control permits of the change-over from the connection of Fig. 1 to the connection of Fig. 2 and this also is regulated in such manner that this change-over only takes place after all slip has ceased in the clutch, this also being provided so as to avoid any abrupt change in voltage due to this change-over from causing a substantial shock in the transmission.

Such a control for changing-over connections may have any appropriate form. It comprises for example a relay 10 (see Figs. 1 and 2), the coil 11 of which is supplied from a source 12, and which actuates switches or reversing switches 13 in such manner as to carry out the progression connections of Fig. 1 or the battery-charging connections of Fig. 2, depending on whether the device 12 develops a voltage less than or greater than a pre-determined value. This voltage source 12 is controlled in dependence of any factor which is characteristic of the operation of the dynamo, for example of the dynamo speed and/or the dynamo voltage and/or any other suitable factor.

In accordance with the invention, this connection-changing control can be made active either before or after the action of the battery-charging regulator, with the provision that the beginning of the action of the two controls is subsequent to the slip phase of the clutch. In the first case, the charging will always be effected under the optimum conditions, but will be slightly retarded; in the second case, the charging will have a preliminary phase which will increase its extent under unusual conditions.

In order to combine the advantages of these two cases, means is preferably provided in accordance with the invention for causing the initiation of activity of the connection-changing control and the battery-charging control to coincide, and this is effected by means of a single common device such as the unit 10—11—12, thus taking full advantage of the additional feature of a simplified construction.

The particular features referred to above are of course applied within the scope of the invention both to the diagrammatic connection of Fig. 1 and to any other connection of progression which incorporates a dynamo as a source of current at least during one phase of operation.

Figure 4:
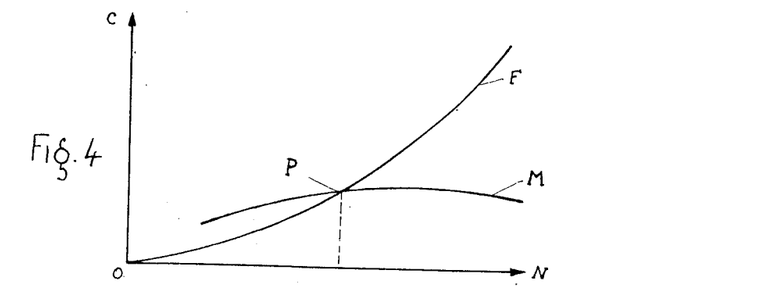

Reference will now be made to the curve of Fig. 4, in which the speed of the dynamo, and therefore of the engine, is plotted as abscissae ON and the torque as ordinates OC. There is shown in Fig. 4 at F the characteristic curve of the torque transmitted by the clutch, and at M the characteristic curve of the torque developed by the engine, the curve M being drawn for the full throttle opening. The curves F and M intersect at the point P, which constitutes the point of coupling of the transmission at full throttle, corresponding for example to a speed of 1800 r.p.m. At the point P, the clutch may or may not slip, depending on whether the opposing torque of the vehicle is greater or less than the ordinate of the point P. In any case, in the region of the curve which is located at the right of the point P, the engine tends to be slowed down by the clutch, which transmits the entire torque, and in the region of the curve located to the left of the point P, the engine tends to accelerate since a part of its torque is not transmitted by the clutch. It is for this reason that the point P is known as the coupling point.

Figure 5:
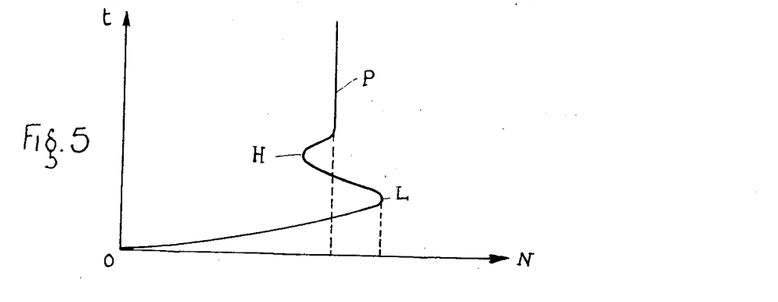

The applicants have found during the course of tests that under the action of the accelerator, the engine does not reach the coupling point P with a continuously increasing variation of its speed. The engine torque increases with a response time which is shorter than the torque transmissible by the clutch, supplied by a dynamo, the voltage of which is coupled with the engine speed. The motor thus exhibits a peak speed L and then slows down at H to finally reach the coupling speed. This phenomenon is shown on the curve of Fig. 5, in which the speed ON is again plotted as abscissae, while the time OT is plotted as ordinates. The peak speed L may thus reach for example 2,100 r.p.m.

Figure 6:
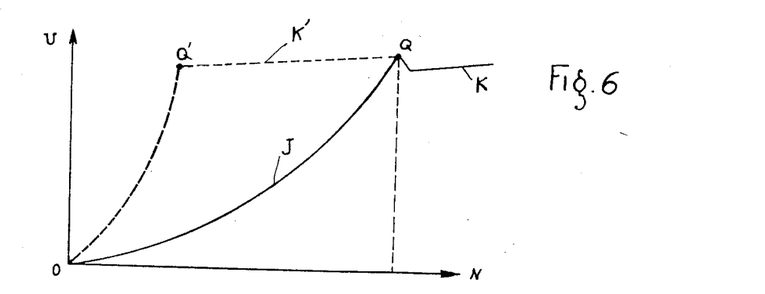

In accordance with the invention, in order to prevent the increase of voltage due to the peak speed L from causing a premature change-over of the progression connection of the dynamo to the charging connection and/or a premature switch-over to charging, which would be likely in both cases to produce a shock in the transmission, provision is made for displacing beyond the peak speed L the critical value of the double control of change of connection and of battery-charging which brings this double control into action. For example, this critical value Q will be chosen so as to correspond to a speed of 2,300 r.p.m. On the curve of Fig. 6, in which the speed ON is plotted as abscissae and the voltage OU at the terminals of the dynamo as ordinates, the curve of progression J is thus extended to Q and is followed by the charging curve K.

In accordance with the invention, the battery-charging speed Q which, as indicated above, is preferably chosen in the vicinity of 2,300 r.p.m. in order to be adapted to the most severe conditions of use, can be chosen in practice to be equal to any other value, provided always that this value is comprised between 1500 and 2,500 r.p.m. Its value is comprised between twice and five times the idling speed, and is preferably in the vicinity of three times this speed. It is preferably comprised between 60% and 120% of the engine speed corresponding to the maximum engine torque at full throttle, and is for example in the neighbourhood of this engine speed.

Such a critical speed Q, the value of which is chosen at a high value in accordance with the invention, has no disadvantage in itself for charging during the course of operation at decreasing speed, since the dynamo is connected with a standard excitation following a curve K', and is only switched-off at the normal circuit-breaking speed Q' which is for example 900 r.p.m.

It is therefore only during the course of operation at increasing speed from a lower speed than Q' that the high value Q according to the invention, could, in the absence of precautions, retard the moment at which the charging of the battery begins.

In accordance with the invention, in order to retain a maximum duration of the charge, means are provided to cause this high value Q to be employed only in the circumstances in which it is useful with a view to the comfort desired, and to substitute a lower value for it in other circumstances.

The adjustment of the value Q according to the conditions of operation is effected in accordance with the invention either by variation of the number of ampere-turns of the battery-charging relay 10 or by modification of the value of the resistances $R_1$ and/or $R_2$, or by these two means in combination. This adjustment can be controlled, either by the travel of the accelerator pedal or by any other factor which varies at the same time as the accelerator depression, such as the sub-pressure in the gas admission pipe, or by the condition of the vehicle, for example the speed of the vehicle or the ratio of the gear-box, etc.

Figure 7:
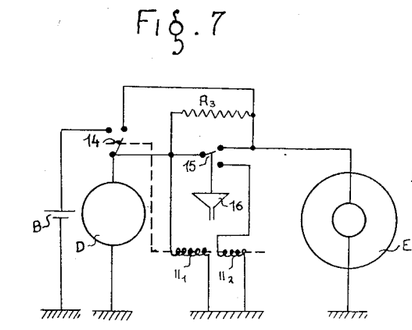
Fig. 7 is an electrical diagram in which the number of ampere-turns on the battery-charging regulator is made variable as a function of the depression in the gas-intake pipe.

Reference will now be made to Fig. 7 in which, by way of example, the critical value Q of the relay 10 is modified as a function of the depression in the gas admission pipe at an intermediate point away from both the throttle valve and the valves. In Fig. 7, the dynamo is shown at D, the battery at B, and the clutch at E. The winding of the battery-charging relay 10 which controls the change-over switch 14 is divided into two parts $11_1$ and $11_2$. The portion $11_1$ is continuously supplied by the dynamo D, whilst the other part $11_2$ is supplied by the dynamo D with the interposition of a switch 15 operated by a pressure capsule 16 actuated by the depression in the gas-admission pipe.

When the user starts the vehicle by pressing strongly on the accelerator, the depression at 16 is small, the switch 15 is open, and the battery-charging relay operates with the coil $11_1$ only. The voltage Q applied to this coil should have a high value for the purpose of actuation of the relay 10, and is obtained at a high speed, which avoids any shock in the transmission in spite of the oscillation of the engine speed. On the other hand, as the speed rises very rapidly in this case, the charging of the battery is effected without delay.

When the user starts the vehicle by pressing slightly on the accelerator, the depression is high at 16, the switch 15 is closed, and the battery-charging relay operates with both the coils $11_1$ and $11_2$. The voltage Q necessary to operate the relay 10 is considerably reduced, but this is not likely to produce any shock since there is no excess speed L of the engine, and the speed P is itself low. In this case also, the charging of the battery is carried out rapidly, but this time by reason of the reduction in the voltage Q.

It can thus be seen that in accordance with the invention, the voltage Q varies automatically as a function of the manner in which the user acts on the acecelrator pedal, while ensuring in all cases a rapid change-over to battery charging without shock.

In the diagram of Fig. 7, there is shown in addition a resistance $R_3$ forming a torque limiter and intended to prevent shocks in the transmission or the skidding of the driving wheels when the user leaves the accelerator pedal unpressed when changing-down gears at a high speed of the vehicle. The resistance $R_3$ is interposed in the supply circuit of the clutch E from the dynamo D, and is shunted by a switch responsive to the condition of the accelerator pedal or to any other factor which is associated with it, for example the depression inside the capsule 16. In addition, the resistance $R_3$ is shunted by the reverse current relay 14 in such manner as to be inoperative, whatever the depression at 16 may be, before the change-over of the battery regulator, this in order to avoid any shock-producing condition during the course of starting.

The invention comprises within its scope such a torque-limiting resistance $R_3$, considered either separately or in combination with all or part of the other ararngements described. Such a combination is illustrated by way of example in Fig. 7, in which the switch for shunting the resistance $R_3$ is constituted by the switch 15 formed as a reversing switch; the capsule 16 for small depressions eliminates the coil $11_2$ and the resistance $R_3$, and for high depressions introduces the coil $11_2$ and, if the battery-charging change-over has taken place, the resistance $R_3$.

Figure 8:
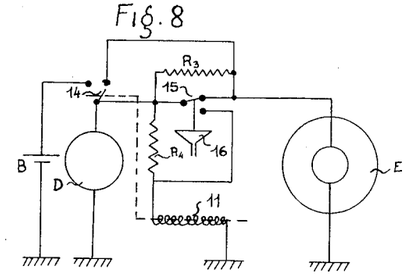
Fig. 8 is an alternative form of this diagram.

Reference will now be made to the diagram of Fig. 8, in which the arrangement is similar to that which has just been described with reference to Fig. 7, and in which the number of ampere-turns on the coil of the battery-regulator relay is again made variable as a function of the depression at 16. In Fig. 8 however, instead of an elimination or introduction of a part $11_2$ of this coil, there is provided with a single coil 11, the introduction or the eliminaton of a resistance $R_4$ connected in series with the coil 11.

Figure 9:
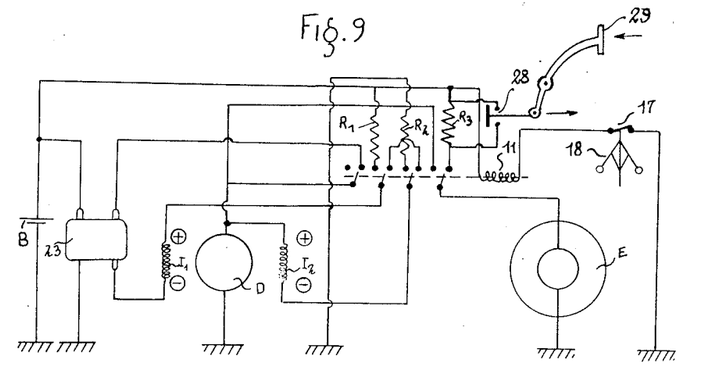
Fig. 9 is a diagram in which the control of the clutch is operated in dependence on the speed of the vehicle.

In the alternative form shown in Fig. 9, the coil 11 of the battery-charging relay is controlled by a switch 17 of a centrifugal governor 18 and depends on the speed of the vehicle. For example, this switch 17 is open or closed, depending on whether the speed of the vehicle is less or greater than a chosen value comprised between 6 km. and 40 km. per hour, and preferably in the vicinity of 25 km. per hour. With this arrangement, the battery-charging change-over is prevented from taking place before the vehicle has reached this speed, this being effected by cutting-off the supply of the battery regulator. The battery-charging change-over can be provided at a low speed, for example, 1100 r.p.m., since, due to the action of the governor 18, the change-over cannot be made at less 25 km. per hour.

In addition, a resistance $R_3$ is provided in the supply circuit of the clutch E from the battery B. The resistance $R_3$ is shunted by a switch 28 which is controlled in dependence on the position of the accelerator pedal 29, so that before a pre-determined travel of the pedal 29 has been made the resistance $R_3$ is introduced, and beyond this distance, the resistance $R_3$ is eliminated. Such a critical degree of opening of the throttle-valve is preferably chosen between the closed position and the half-open position, and is with advantage at about one quarter opening.

The resistance $R_3$ can only be introduced above the speed of the vehicle which closes the switch 17, with a view to avoiding shocks during starting, as in the case of Fig. 7. It forms a torque limiter intended to avoid skidding of the driving wheels during the course of changing-down gears followed by a small opening. The resistance $R_3$ should be chosen fairly large in order to ensure this function, but at the same time should be small enough so as not to cause any slip when the user finds himself above the critical speed of the vehicle for the closure of the switch 17, at a small throttle opening.

Figure 10:
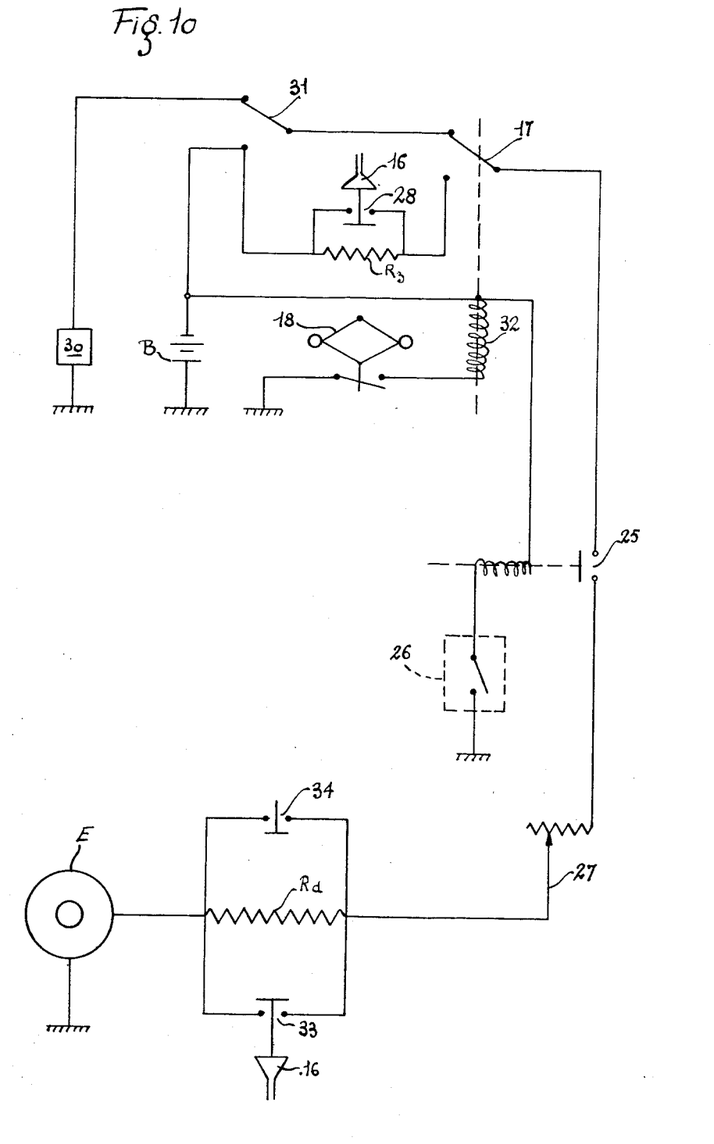
Fig. 10 is an alternative form of this diagram.

Reference will now be made to Fig. 10, in which the arrangement is similar to that of Fig. 9, but which relates to an application of the invention to any system of supply from a dynamo having a progressive characteristic, for example the dynamo of Fig. 1, or more particularly a dynamo with three brushes, the third brush of which is located between the two main brushes, especially behind the positive brush, and supplies the clutch, or a dynamo having a field winding which is first of all excited from a source of constant voltage and then in shunt, etc.

In Fig. 10, there is shown diagrammatically at 30 the progressive source of supply, and at B the battery with an emergency change-over switch 31. At 17 there is again shown the member controlled by the speed of the vehicle, in this case in the form of a single pole double throw switch and actuated by a relay 32 associated with the speed-governor 18. The single pole double throw switch 17 has one terminal supplied from the source 30 and another terminal supplied from the battery B through the intermediary of the resistance $R_3$, shunted at 28. The switch 28 is actuated by the capsule 16.

In the example shown, which is more particularly directed to a source 30 of the three-brush dynamo type, the moving finger of the single pole double throw switch 17 is connected to the clutch through the medium of a de-clutching relay 25 which can be controlled in dependence on the condition of the gear-changing lever 26, a wear resistance adjustable at 27, and a foot-up resistance $R_d$. The resistance $R_d$ is shunted on the one hand by a switch 33 controlled by a capsule 16, and on the other hand by a switch 34 responsive to the slope taken up by the vehicle.

The operation is similar to that which has already been described with reference to Fig. 9. It should be noted that between the resistance $R_3$, which can only be introduced on battery supply, and the clutch is interposed a resistance $R_d$ which can be introduced for either source of supply, battery B or source 30. The resistance $R_d$ acts when at the same time the slope is less than a given value, for example 10 or 15%, and the accelerator pedal is released. It is cut-out if the slope is greater than this value and/or if the pedal is sufficiently depressed.

Figure 11:
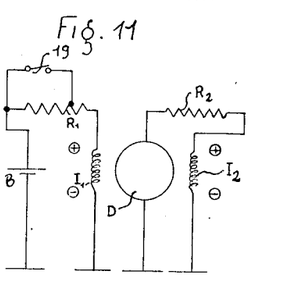
Fig. 11 is a diagram in which the resistance of one of the field circuits is made variable as a function of the ratio of the gear-box.

Reference will now be made to Fig. 11 in which the adjustment of the value Q is obtained by modification of the value of the resistance $R_1$ as a function of the ratio of the gear-box. There is shown at 19 a switch which shunts a part of the resistance $R_1$, and which is open in first gear or reverse gear and closed in second gear and higher ratios of the gear-box. By means of this arrangement, an excellent progression of the clutch is retained in first gear and in reverse gear, whilst the charging of the battery is retarded, but this latter drawback has no importance since the time for which these ratios of the gear-box are in use is relatively short. On the other hand, on the other ratios, the curve J is straightened with reduction of the coupling speed P and the battery-charging change-over speed Q, which, for a less degree of progression which is desirable on these other ratios, ensures charging without delay of the battery B. It is also possible to act on the resistance $R_2$ as a function of the ratio of the gear-box, or simultaneously on the resistances $R_1$ and $R_2$.

The invention also comprises means for reducing the margin of safety provided between the battery-charging speed Q and the coupling speed P. These means consist in putting a time-lag on the circuit of the battery-charging relay 10. The change-over is then delayed by a time sufficient for the engine speed to have completed its oscillations at the moment when the battery-charging change-over becomes possible.

Figure 12:
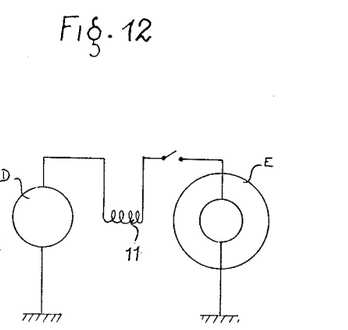
Fig. 12 is a diagram in which the battery-charging regulator has a time-delay.

In one form of embodiment of these means shown in Fig. 12, the coil 11 of the relay 10 is coupled in series with the clutch E. By virtue of this arrangement, during the peak speed L of the engine, since there is no current flowing through the clutch, neither is there any current through the coil 11, which becomes insensitive to the over-voltages resulting from the peak L. It is to be noted that the connection of Fig. 11 is of particular advantage when the de-clutching which accompanies the changes in gear is effected by a de-clutching device other than the clutch itself. In fact, in the contrary case, the circuit would be broken at each change of gear.

Figure 13:
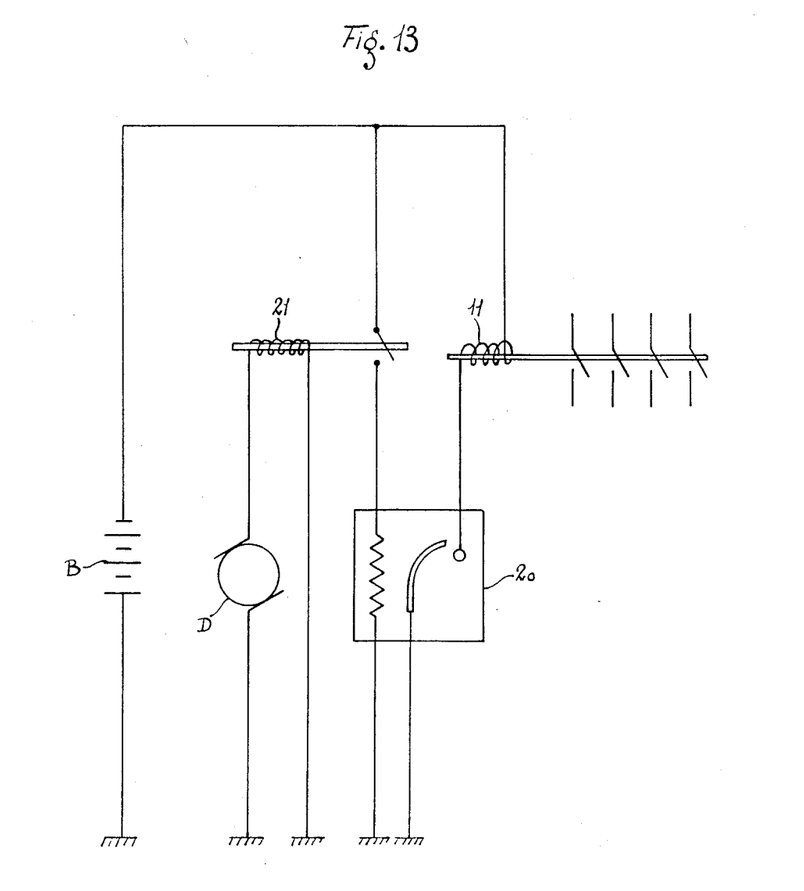
Fig. 13 is an alternative form of this diagram.

In an alternative form shown in Fig. 13, the supply circuit of the coil 11 of the relay 10 comprises a bi-metallic strip switch 20 or other time-delay device put in action by a voltage relay 21 which is excited by the dynamo D. The release speed of the relay 21 can thus be chosen relatively low, for example, 1,000 r.p.m., and the time necessary for the opening of the bi-metallic switch 20, for example three or four seconds, is fixed so that the slip of the clutch has ceased.

Figure 14:
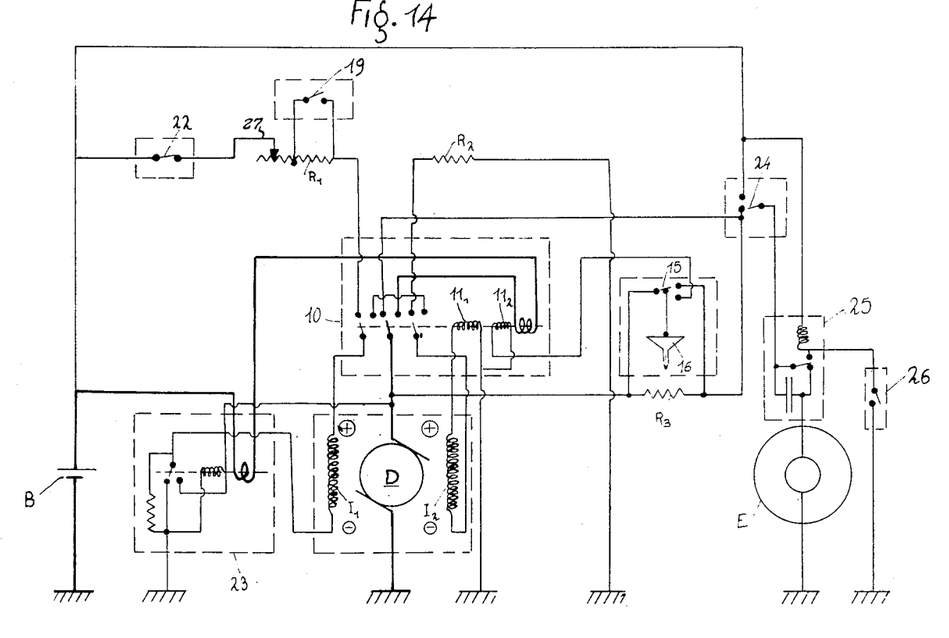
Fig. 14 is a diagram of a general supply circuit for an electro-magnetic clutch.

Reference will now be made to Fig. 14 in which is shown a complete diagram of the supply of an electromagnetic clutch E. The circuit of Fig. 14 combines the arrangements of Figs. 1 and 2, Fig. 7 and Fig. 11. There are again shown in Fig. 14 at D the dynamo with the field windings $I_1$ and $I_2$, at B the battery, at 10 the battery-charging relay with the coil portions $11_1$ and $11_2$, at 15 the switch control by the depression of the capsule 16 with the resistance $R_3$, at $R_1$ the resistance which co-operates with the portion $I_1$ of the field winding, and one part of which is shunted by the switch 19 responsive to the ratio of the gear-box, and at $R_2$, the resistance which co-operates with the portion $I_2$ of the field winding. In addition, there is shown in Fig. 14 at 27, a means of regulation of the resistance $R_1$ in order to take account of wear, at 22 the general ignition contact, at 23 the voltage regulator, the battery-charging device of which is separate and installed at 10. The voltage of this regulator is chosen to be greater than the battery-charging change-over voltage of this device. This is an advantage when the friction surfaces of the clutch have variations of their coefficient of friction with the temperature and the duration of slip under heavy load. In certain cases, for reasons of economy in current consumption, it is possible to choose a voltage of regulation less than the battery-charging change-over voltage. At 24 is shown an emergency single pole double throw switch intended to connect the clutch E to the battery in case of failure of the dynamo D, and at 25 a de-clutching relay is controlled in dependence on the condition of the gear-changing control 26 so as to be open or closed, depending on whether the gear-changing lever is actuated or not.

Figure 15:
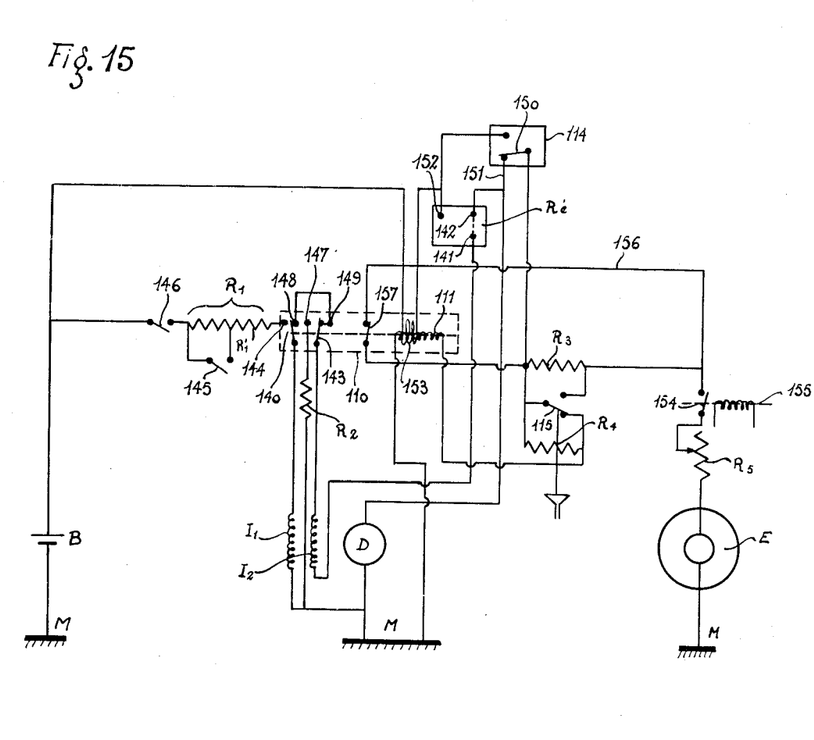
Fig. 15 is an alternative form of an electric connection diagram of a vehicle equipped with an automatic clutch, in accordance with a particular form of mixed excitation of the dynamo.

Reference will now be made to Fig. 15, in which there is designated by B the accumulator battery of the vehicle, by D the dynamo, and by E the electro-magnetic clutch. The field circuit of the dynamo D is provided with two windings $I_1$ and $I_2$. The winding $I_1$ is connected between the earth M and the moving contact 140 of the electro-magnetic switch 110, whilst the winding $I_2$ is connected between the excitation terminal 141 of the standard battery-charging regulator $Re$ (the dynamo terminal 142 of which is connected to the positive pole of the dynamo D) and the moving contact 143, the voltage at 141 remaining equal to the voltage of the dynamo until the regulating device limits this voltage.

The contact 144 of the switch 110 is connected to the positive pole of the battery B through the intermediary of a resistance $R_1$ (this resistance being reduced to $R'_1$ when it is partly short-circuited by the contact 145 which is controlled and closed when the gear-combination engaged is the second or a higher ratio) and by the general contact 146.

The contact 147 of the switch 110 is connected to earth at M through the medium of the resistance $R_2$. The contacts 148 and 149 are electrically coupled together.

The moving contacts 140 and 143 can establish three different connections, depending on their positions:

From the position shown in Fig. 15, in which the contacts 140 and 143 are in electric contact with the contacts 144 and 147 respectively, and in a first phase of their movement under the control action to be described later, this electric coupling persists in identically the same form.

When the control action reaches a certain value, the moving contact 140, while remaining in contact with the stud 144, comes into contact with the stud 148, whilst the moving contact 143, while remaining in contact with the stud 147, comes in contact with the stud 149.

When the control action reaches a higher value, the moving contact 140 moves away from the stud 144 while remaining connected to the stud 148, whilst the moving contact 143 moves away from the stud 147 while remaining connected to the stud 149.

There will be described later an example of a form of construction of switch which carries out a function of this kind.

The control action of the moving contacts 140 and 143 of the switch 110 is derived from the coil 111 connected between the earth M and the moving contact 150 of the emergency single pole double throw switch 114, through the medium of the resistance $R_4$, the moving contact 150 being normally either connected to the voltage of the dynamo B by the conductor 151 or, in case of a fault, to the voltage of the battery B. The battery terminal 152 of the change-over regulator Re is connected to the battery B through the medium of a coil 153 of a few turns, in the switch 110, the ampere-turns of which, when they exist, are added to those of the coil 111.

It can be seen that the clutch E is supplied through the intermediary of the adjustable resistance $R_5$, of the contact 154 operated by the relay 155, and from thence to the moving contact 150 of the single pole double throw switch 114, either through the resistance $R_3$, or through the short-circuit contact 115 of this resistance $R_3$, or by the conductor 156 comprising the contact 157 of the switch 110. The contact 115 is operated by a condition of operation of the vehicle, for example the depression in a capsule 16' connected with the admission pipe, and short-circuits the resistance R3 when the depression is small (for example when starting with the throttle fully open) and the resistance $R_4$ when the depression is large (starting with the throttle slightly open).

No further description will be given of the operation at continuous speed of this device, of which numerous examples have previously been given. In this case, only the particular features relating to the previous arrangement will be dealt with.

It has been seen that at the beginning of a starting period, the field winding circuit $L_1$ is supplied from the battery B through the resistance $R_1$ (since the gear lever is engaged in first gear). The winding $I_2$ is supplied by the dynamo voltage through the resistance $R_2$. The moving contacts 140 and 143 are connected to the studs 144 and 147 respectively.

The clutch E is supplied with the voltage of the dynamo D through the conductor 156, the closed contact 157 and the regulating resistance $R_5$, this resistance $R_5$ being regulated according to the value of the air-gap, and thus of the wear of the clutch.

If the driver starts by accelerating slightly, the resistance $R_4$ is short-circuited, and the voltage at the terminals of the coil 111 of the switch 110 is that of the dynamo.

On the other hand, if the driver accelerates strongly, the depression being small, the resistance $R_4$ is put into circuit and the voltage at the terminals of the coil 111 is less than that of the dynamo.

In any case, at a given voltage of the dynamo (and thus at a given engine speed) which is variable, depending on the manner of starting, there will arrive a moment at which the force of attraction of the coil 111 will be such that the moving contacts 140 and 143 will be in contact with the studs 144, 148 and 147, 149 respectively, that is to say the windings $I_1$ and $I_2$ will both continue to be supplied both by the dynamo and by the battery.

The engine speed increasing the voltage at the terminals of the coil 111 becomes sufficient at the moment when the engagement of the clutch is completed, to attract the moving contacts 140 and 143 to a position such that they are separated from the studs 144 and 147 respectively, and are only connected to the studs 148 and 149 respectively. In this third connection, the windings $I_1$ and $I_2$ are supplied in series from the voltage of the dynamo without any inserted resistance. The dynamo voltage then rises immediately up to its regulated value, and the battery-charging regulator Re establishes the connection between the terminals 142 and 152, which enables the charging of the battery B to commence. The clutch E is supplied through the resistance $R_5$, either through the medium of the resistance $R_3$ when the depression is large, or directly if the depression is small (resistance $R_3$ short-circuited by the contact 115).

It should be noted that as soon as the battery-charging change-over is effected, the attractive force of the coil 111 on the contacts 140, 143 and 157 which keeps them in the normal position of excitation of the dynamo when charging the battery, is increased by the ampere-turns introduced by the turns 153 through which the charging current passes.

By virtue of this auxiliary winding, good synchronisation is ensured between the change-over of the battery-charging regulator Re and the switching by the device, this synchronisation being an advantage, as has already been indicated above; for example, in the case where an insufficient regulation caused the battery-charging regulator to switch over a little before the commutation; in this case, the supply of the turns 153 would however produce the change-over and would thus ensure immediate charging of the battery at a correct voltage.

A further advantage of the turns 153 is the following:

When the dynamo is excited in shunt (normal charging of the battery), it may happen that at certain relatively low engine speeds, by pressing sharply on the accelerator pedal, the resistance $R_4$ is inserted in the circuit of the coil 111, which could reduce the current passing through this coil 111 sufficiently to bring back the change-over switch 110 into the position of connection in mixed excitation, which would limit the charge of the battery. Such an eventuality is excluded by means of the turns 153.

It will be noted that when the gear lever is engaged in the second or third gear, the resistance in series between the battery B and the stud 144 is reduced to a value $R'_1$ by means of the closure of the contact 145. The considerable degree of progression which is obtained in first gear by means of the whole of the resistance $R_1$ is no longer necessary in this case, and the increase in voltage at the terminals of the clutch E then takes place more rapidly, which is in accordance with the requirements of practice.

It will be recalled that the resistance $R_3$ acts as a torque limiter during a change-down of gears with the foot lifted (large depression), which enables any shock to the transmission due to the large differences between the engine speed and that of the transmission shaft to be avoided.

The change of form of excitation of the dynamo which has just been described can be applied to any control device for an electro-magnetic clutch of the type in which the excitation of the dynamo is controlled with a view to obtaining a voltage curve at the terminals of the clutch having a general parabolic shape, of which the slope at the origin is suited to delicate manoeuvres, and the rising portion of which is sufficiently steep to ensure a coupling at a reasonable speed, it being possible to obtain this control by combining together an excitation from the constant voltage of the accumulator battery and from a voltage variable with the engine speed such as that produced at the terminals of the armature of the dynamo.

What we claim is:

1. A control circuit for an electro-magnetic clutch, especially for a vehicle propelled by an internal-combustion engine provided with a dynamo having at least one field circuit and a rotating armature, a voltage-regulator and battery-charging change-over device for said dynamo, an accumulator battery, gear-changing lever and a gear-box, said circuit comprising means for supplying said electro-magnetic clutch with energizing current from said dynamo armature; a first field circuit for said dynamo having a first current source means; a second field circuit for said dynamo having a second current source means; one of said source means having a constant direct-current voltage for exciting said first field circuit during at least the greater part of the period of engagement of said clutch; and change-over switching means for making said other source excite both said circuits.

2. A control circuit as claimed in claim 1, wherein said other source is formed by the dynamo armature.

3. A control circuit as claimed in claim 1, wherein said first circuit comprises a first resistance and said second circuit comprises a second resistance.

4. A circuit as claimed in claim 1, and further comprising means for controlling said change-over switching device in dependence on the speed of said dynamo.

5. A circuit as claimed in claim 1, in which the said change-over switching means is actuated at the same moment as the said voltage-regulator change-over device for charging the battery from said dynamo.

6. A circuit as claimed in claim 1, and further comprising means for retarding the operation of said voltage-regulator change-over device beyond the period of slip of said clutch.

7. A circuit as claimed in claim 1, in which the operation of said voltage-regulator change-over device is effected at a speed greater than the maximum transient engine speed with full throttle opening during starting of said vehicle.

8. A circuit as claimed in claim 1, in which the operation of said voltage-regulator change-over device is effected at an engine speed comprised between twice and five times the idling speed of said engine.

9. A circuit as claimed in claim 1, in which the operation of said battery-charging change-over device is effected at an engine speed of approximately three times the idling speed of said engine.

10. A circuit as claimed in claim 1, in which the operation of said battery-charging change-over device is effected at an engine speed greater than the normal battery-charging speed, and when the speed of said vehicle is comprised between 6 km. per hour and 40 km. per hour.

11. A circuit as claimed in claim 1, in which the operation of said battery-charging change-over device is effected at an engine speed greater than the normal battery-charging speed, and when the speed of said vehicle is greater than about 25 km. per hour.

12. A circuit as claimed in claim 1, and further comprising torque-limiting means for said clutch, constituted by a resistance; and means for introducing said resistance into said clutch circuit above a pre-determined speed of said vehicle, when the throttle opening of said engine is less than a pre-determined value.

13. A circuit as claimed in claim 1, and further comprising torque-limiting means for said clutch, constituted by a resistance; and means for introducing said resistance into said clutch circuit above a pre-determined speed of said vehicle, when the throttle opening of said engine is less than about one quarter of the total throttle opening.

14. A circuit as claimed in claim 1, in which the operation of said battery-charging change-over device is effected after a predetermined lapse of time following the passing of said engine speed beyond the normal speed of battery-charging during the course of starting said vehicle.

15. A circuit as claimed in claim 1, and further comprising relay means connected in the supply circuit of said clutch, said relay means being adapted to operate simultaneously the said battery-charging change-over device and said switching means for changing the form of excitation of said dynamo.

16. A circuit as claimed in claim 1, and further comprising means for varying the voltage at which said battery-charging change-over device comes into operation, whereby the speed at which said device operates is made variable in dependence on the ratio of the gear-box in use, and increases as the said ratio becomes smaller.

17. A circuit as claimed in claim 1, and further comprising an electro-magnetic device for simultaneously effecting the actuation of said battery-charging change-over device and the said change-over switching means, the number of ampere-turns on said electro-magnetic device depending on the throttle opening of said engine.

18. A circuit as claimed in claim 1, and further comprising an electro-magnetic device for simultaneously effecting the change-over to battery-charging and the change of the mode of excitation of said dynamo; a continuously-excited winding for said device; and an auxiliary winding for said device, the energisation of said auxiliary winding being effected in dependence on the throttle opening of said engine.

19. A circuit as claimed in claim 18, in which the action of said auxiliary winding varies inversely with the said throttle opening, in order to ensure the change-over to battery-charging at a lower voltage of said dynamo.

20. A circuit as claimed in claim 1, and further comprising a resistance interposed in the supply circuit of the operating coil of said battery-charging change-over device.

21. A circuit as claimed in claim 20, and further comprising means for short-circulating said resistance at small throttle openings of said engine.

22. A circuit as claimed in claim 1, in which the transition from one form of excitation of said dynamo to the other is effected by said change-over switching means with an intermediate coupling device, whereby the excitation of said dynamo is continuously ensured at a value comprised between the limiting values of the said two forms of excitation.

References Cited in the file of this patent

UNITED STATES PATENTS

| | | |
|---|---|---|
| 2,247,814 | Lamborn | July 1, 1941 |
| 2,571,827 | Bradley | Oct. 16, 1951 |
| 2,782,322 | Hysler | Feb. 19, 1957 |
| 2,815,974 | Stubbe | Dec. 10, 1957 |